United States Patent
Chen et al.

(10) Patent No.: US 12,132,725 B2
(45) Date of Patent: Oct. 29, 2024

(54) SETTING SYSTEM TIME FOR SERVER CERTIFICATE VALIDATION

(71) Applicant: Hewlett Packard Enterprise Development LP, Spring, TX (US)

(72) Inventors: Xiaoqing Chen, Beijing (CN); Kangchang Huang, Beijing (CN); Xin Zong, Beijing (CN)

(73) Assignee: Hewlett Packard Enterprise Development LP, Spring, TX (US)

(*) Notice: Subject to any disclaimer, the term of this patent is extended or adjusted under 35 U.S.C. 154(b) by 301 days.

(21) Appl. No.: 17/931,992

(22) Filed: Sep. 14, 2022

(65) Prior Publication Data

US 2024/0089246 A1    Mar. 14, 2024

(51) Int. Cl.
*H04L 9/40* (2022.01)
*H04J 3/06* (2006.01)

(52) U.S. Cl.
CPC ........ *H04L 63/0823* (2013.01); *H04J 3/0667* (2013.01); *H04L 63/20* (2013.01)

(58) Field of Classification Search
CPC ... H04L 63/0823; H04L 63/20; H04L 3/0667; H04W 56/00
See application file for complete search history.

(56) References Cited

U.S. PATENT DOCUMENTS

| | | | |
|---|---|---|---|
| 7,873,024 B1 * | 1/2011 | Fenwick | H04J 3/0673 370/324 |
| 8,327,448 B2 | 12/2012 | Eldar et al. | |
| 9,918,353 B2 | 3/2018 | Liang et al. | |
| 10,955,872 B2 | 3/2021 | Maddukuri et al. | |
| 2014/0095887 A1 | 4/2014 | Nayshtut et al. | |

(Continued)

FOREIGN PATENT DOCUMENTS

| CN | 109615838 A | * 4/2019 | ............. G08C 17/02 |
|---|---|---|---|
| CN | 116846681 A | * 10/2023 | |

(Continued)

OTHER PUBLICATIONS

Signiant's, "Troubleshooting Certificates", available online at <https://help.signiant.com/flight-deck/certificates/troubleshooting-certificates>, May 25, 2022, 6 pages.

(Continued)

*Primary Examiner* — Sarah Su
(74) *Attorney, Agent, or Firm* — Hewlett Packard Enterprise Patent Department

(57) ABSTRACT

Implementations of the present disclosure relate to setting a system time of an access point (AP) for server certificate validation. A method comprises obtaining a default time as a system time of the AP after an AP boots up. The method also comprises obtaining a memory time from a flash memory of the AP. The method also comprises updating the system time with the memory time obtained from the flash memory. The method also comprises validating a server certificate received from an authentication server based on the system time. The system time is synchronized with a network time if the server certificate is successfully validated based on the system time. The synchronized system time is then written into the flash memory. In this way, the authentication can be performed based on a reasonable system time even if the AP reboots.

20 Claims, 7 Drawing Sheets

(56) References Cited

U.S. PATENT DOCUMENTS

2014/0314068 A1* 10/2014 Wentink ................ H04W 56/00
                                                    370/350
2015/0334109 A1* 11/2015 Kasai ........................ H04L 9/40
                                                    358/1.14
2019/0239173 A1*  8/2019 Jia ....................... H04W 56/001

FOREIGN PATENT DOCUMENTS

KR           102493764 B1 *  2/2023    ............... H04L 7/02
WO    WO-2011063047 A1 *  5/2011    ........ H04W 56/0015

OTHER PUBLICATIONS

Tibco Software Inc., "Setting the Time Zone and Time", available online at <https://docs.tibco.com/pub/loglmi/6.3.1/doc/html/GUID-DC07F3EC-2CA8-4643-80CA-5448F3416291.html>, 2020, 1 page, May 25, 2022.

* cited by examiner

SETTING SYSTEM TIME FOR SERVER CERTIFICATE VALIDATION

BACKGROUND

An authentication between a client and a server refers to a process that both the client and the server need to exchange and validate each other's certificate for a session established between the client and the server. In a case of the client validating a server certificate, the client needs to obtain the server certificate from the server and then validate it, to make sure that the server is trustable. Similarly, the server validates a client certificate received from the client. If the authentication is successfully completed, the client may access to a network through the server.

BRIEF DESCRIPTION OF THE DRAWINGS

Through the following detailed descriptions with reference to the accompanying drawings, the above and other objectives, features and advantages of the example implementations disclosed herein will become more comprehensible. In the drawings, several example implementations disclosed herein will be illustrated in an example and in a non-limiting manner, where.

DETAILED DESCRIPTION

As mentioned above, during the authentication, in a case of a client validating a server certificate, if the system time of the client is not within the validity period of the server certificate, the client will reject the server certificate. However, if the system time is not a correct time (for example a few weeks or a few years earlier than a current time), the client may reject the server certificate by mistake.

A Real-Time Clock (RTC) is an electronic device for measuring the passage of time. A client without an RTC cannot keep the system time consistent with a current time if the client is powered off. In some cases, the consistency of the system time may be interrupted even if the client has an RTC, for example, a power supply to the RTC is cut off. Such clients generally perform a cold boot up with an initial system time set from build information of a firmware by default. Time from build information may be much earlier than the current time. Therefore, the authentication between the client and the server may fail unexpectedly.

Traditionally, the system time of the client is set to a current time manually. However, if the client reboots, the manually set system time will be lost and the authentication will fail unexpectedly again. Therefore, example implementations of the present disclosure propose obtaining a reasonable time as the system time, and storing the reasonable system time into a flash memory of the client, such that the authentication can be performed based on a reasonable system time of the client even if the client reboots. The term "reasonable system time" as described herein may refer to a time closer to a current time than the build time.

When the client boots up, the system time of the client may be initialized with a default time. For example, the client may obtain the default time from build information of a firmware of the client, or may set the system time to a default time according to a certain protocol. Then the client may obtain a memory time from a flash memory of the client, to update the system time with the memory time.

The server certificate received from the authentication server may be validated based on the updated system time. If the server certificate is successfully validated based on the updated system time, the client may be connected to a network. Once the client is connected to the network, the system time may be synchronized with a network time. This network time may be closer to a current time. Then the client may write the synchronized system time into the flash memory. In this way, there is no need to manually set the system time at each time the client boots up or reboots and the validation of the server certificate can be performed based on a reasonable system time.

Figure 1:
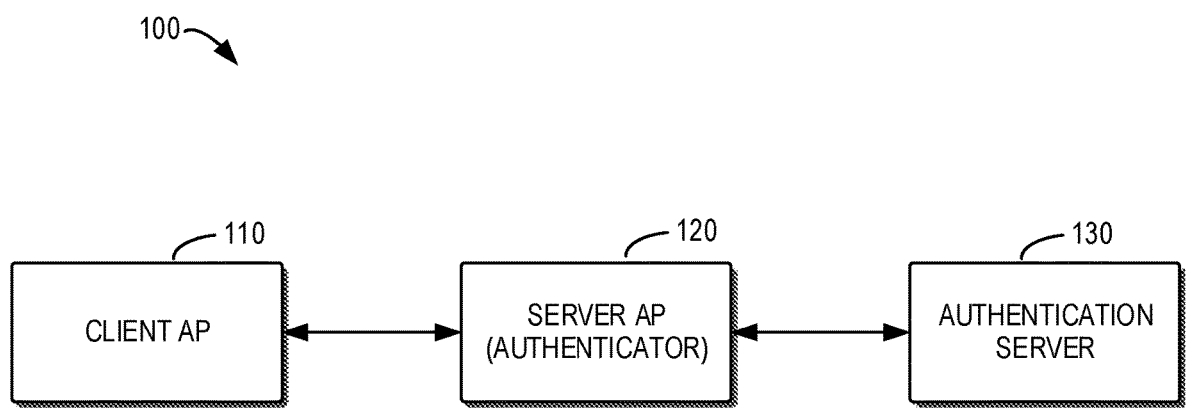
FIG. 1 illustrate a block diagram of an example environment in which example implementations of the present disclosure may be implemented.

FIG. 1 illustrates an example environment 100 in which example implementations of the present disclosure may be implemented. The example environment 100 may be implemented as a wireless communication network and/or a wired communication network. The example environment 100 may include a client access point (AP) 110, a server AP 120 and an authentication server (also refers to "server" as described herein) 130. The client AP 110 may be connected to the authentication server 130 via the server AP 120. The server AP 120 may act as an authenticator for receiving an access request and a client certificate from the client AP 110 and replaying the access request and the client certificate to the authentication server 130. The server AP 120 may also receive messages (e.g. including a server certificate and reception/rejection messages) from the authentication server 130 and replay the messages to the client AP 110. This will be discussed in detail later with reference to FIG. 2.

The client AP 110 refers to any device with wireless or wired communication capabilities. The client AP 110 also refers to such a device that a system time of the client AP 110 is unable to keep consistency with a current time during a power off of the client AP. Examples of the client AP 110 may include, but not limited to a Radio Router, a Radio Transceiver, a switch, Wi-Fi hotspot device, Basic Service Set (BSS), Extended Service Set (ESS), Radio Base Station (RBS) and so on. The server AP 120 may include, be implemented as, or known as a Radio Router, a Radio Transceiver, a switch, Wi-Fi hotspot device, Basic Service Set (BSS), Extended Service Set (ESS), Radio Base Station (RBS) and so on.

It is to be understood that the specific numbers of the client AP, server AP and authentication server in FIG. 1 are only for the purpose of illustration without suggesting any limitations. The example environment 100 may include any suitable number of the client AP, server AP and authentication server configured for implementing embodiments of the present disclosure.

A network in the example environment 100 may be a Local Area Network (LAN), a Wide Area Network (WAN) and/or Internet. Communications in the example environment 100 may operate according to the wireless/wired communication protocols such as Institute of Electrical and Electronic Engineers (IEEE) 802.1 standards, Wi-Fi Alliance Specifications, IEEE 802.3 standards, or any other suitable communication standards. An architectural framework of the network in the example environment 100 may be Extensible Authentication Protocol (EAP) over LAN (EAPOL). The EAP may provide extensibility for authentication methods for commonly used protected network access technologies, such as IEEE 802.1X-based wireless access, IEEE 802.1X-based wired access, and Point-to-Point Protocol (PPP) connections such as Virtual Private Networking (VPN). EAP is not an authentication method, but rather a framework on the access client AP and authentication server that allows networking vendors to develop and easily install new authentication methods known as EAP methods.

In the implementations of the present disclosure, the client AP 110 and the authentication server 130 both have valid certificates and are trustable to each other. However, an authentication between the client AP 110 and the authentication server 130 may fail unexpectedly due to the incorrect system time of the client AP 110. Thus, after the client AP 110 boots up, the system time of the client AP 110 may be set to a reasonable time in accordance with implementations of the present disclosure. This will be described below with reference to FIGS. 3 and 4.

Figure 2:
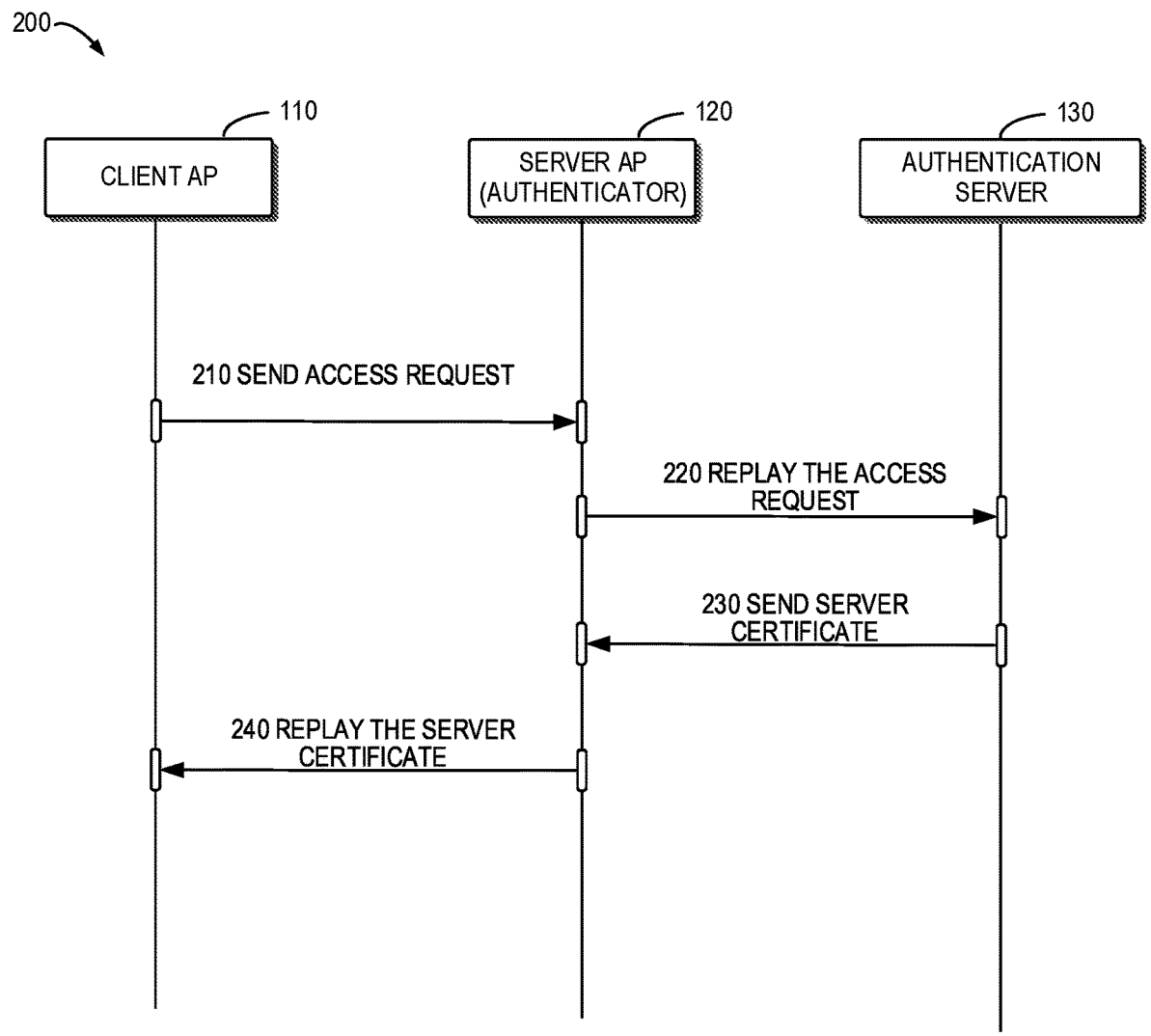
FIG. 2 illustrates an example signaling flow in accordance with some example implementations of the present disclosure.

FIG. 2 illustrates an example signaling flow 200 in accordance with some example implementations of the present disclosure. In some implementations, the authentication between the client AP 110 and the authentication server 130 may be an 802.1X authentication. The 802.1X authentication is an IEEE standard that provides an authentication framework for LANs. In the 802.1x authentication, the EAP is used for exchanging messages during the authentication process. The authentication protocols that operate inside the 802.1X framework that are suitable for networks include EAP-TLS, PEAP, and EAP-TTLS. These protocols allow the authentication server 130 to authenticate the client AP 110 while also allowing the client AP 110 to authenticate the authentication server 130.

The 802.1X authentication may include three components: a supplicant (such as the client AP 110), an authenticator (such as the server AP 120) and an authentication server (such as the authentication server 130). The supplicant (client AP 110) is the device attempting to gain access to the network. The authenticator (server AP 120) is the gatekeeper to the network and permits or denies access to the supplicant. The authenticator relays information between the authentication server (the authentication server 130) and the supplicant (the client AP 110). The EAP type is consistent between the authentication server 130 and the client AP 110, and is transparent to the server AP 120.

The authentication server 130 provides a database of information required for authentication, and informs the server AP 120 to deny or permit access to the client AP 110. The authentication server 130 may be an EAP-compliant Remote Authentication Dial-In User Service (RADIUS) server which can authenticate (through passwords or certificates) the client AP 110. The server AP 120 may be connected to one or more authentication servers, such as an external RADIUS. The server AP 120 may have its own internal authentication server. Therefore, in a case that an 802.1X EAP-compliant RADIUS server is not available or required for authentication, the server AP 120 may pass client authentication to its internal database or to a backend non-802.1X server.

At 210, the client AP 110 may send an access request (e.g. the Client Hello in accordance with the EAPOL) to the server AP (authenticator) 120. The server AP 120 may then replay the access request to the authentication server 130 at 220. At 230, the authentication server 130 may send the server certificate to the server AP 120. The server AP 120 may then replay the server certificate to the client AP 110 at 240. Then, the client AP 110 may validate the server certificate.

Figure 3:
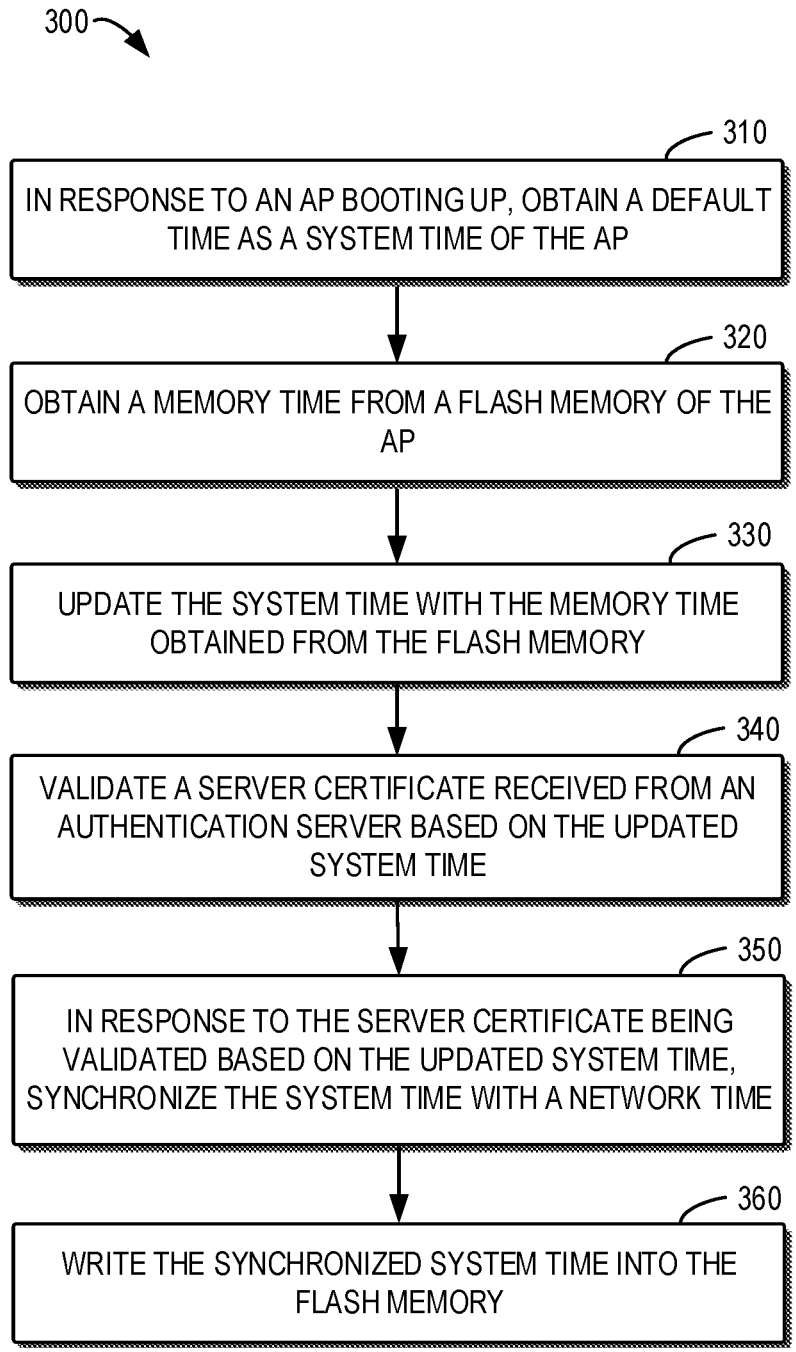
FIG. 3 illustrates a flow chart of a method of setting system time for a validation of the server certificate in accordance with some example implementations of the present disclosure.

FIG. 3 illustrates a flowchart of a method 300 in accordance with some example implementations of the present disclosure. The method 300 may be implemented at the client AP 110 as shown in FIG. 1, for example. For the purpose of discussion, reference is made to FIG. 1 to describe the method 300. It is noted that although only some blocks are shown in the method 300, the method 300 may comprise other operations as described herein.

At block 310, the client AP 110 obtains a default time as a system time of the client AP in response to the client AP 110 booting up. For example, the client AP 110 may obtain a build time from build information of a firmware by default. In some implementations, the client AP 110 may set the system time to a fix time such as Jan. 1, 1900 00:00 by default. The term "build time" as described herein may refer to a time when the firmware is installed into the client AP 110.

Figure 4:
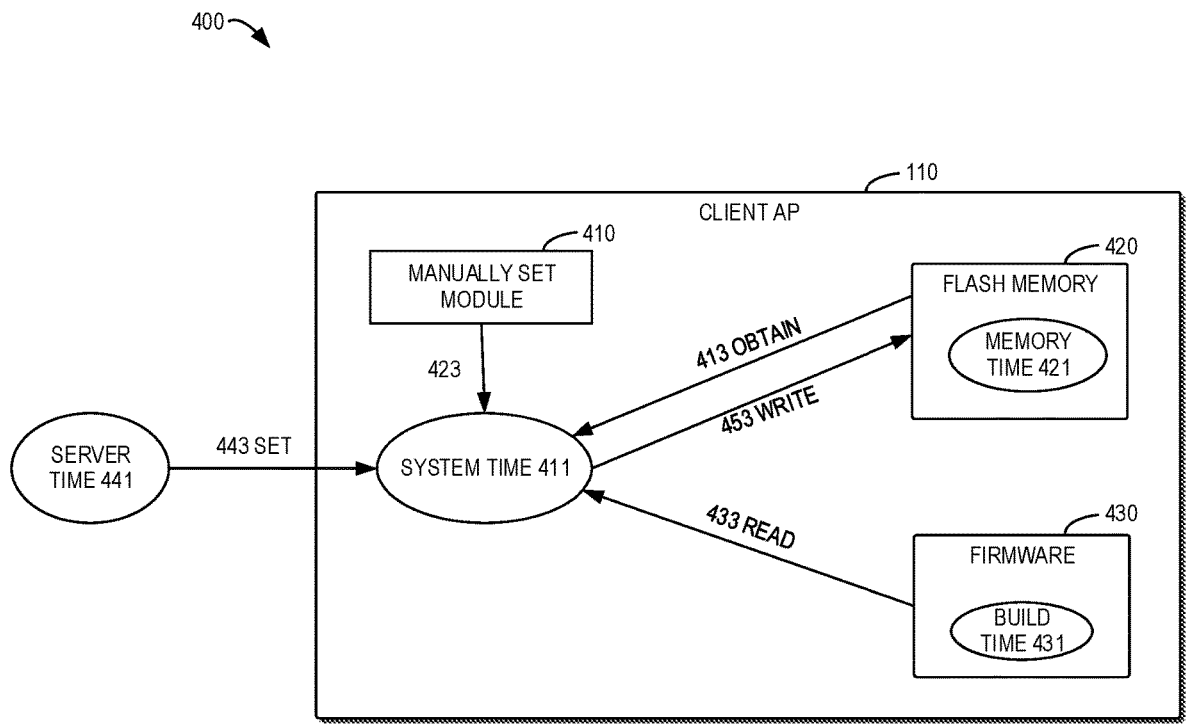
FIG. 4 illustrates a schematic diagram of setting system time for a validation of the server certificate in accordance with some example implementations of the present disclosure.

At block 320, the client AP 110 obtains a memory time from a flash memory of the client AP 110. FIG. 4 illustrates a schematic diagram 400 of setting system time for a validation of the server certificate in accordance with some example implementations of the present disclosure. The client AP 110 has a flash memory 420. The client AP 110 may write 453 the system time 411 into the flash memory 420. The flash memory 420 may store the system time 411 of the client AP 110 as a memory time 421 for use in case of the client AP 110 rebooting. While the client AP 110 is powered off, the system time 411 may be lost because of the client AP 110 lacking an RTC, or a power supply to the RTC being cut off for some reason. Thus, the system time 411 may be unable to keep consistency with a current time during a power off of the client AP 110. The client AP 110 may obtain 413 the memory time 421 from the flash memory 420 as the system time 411. Alternatively, the client AP 110 may use a server time 441 included in the validity period to set 443 the system time 411. The client AP 110 may read 433 the build time 431 from the firmware 430 as the system time 411. The system time 411 may be manually set by a manually set module 410 of the client AP 110 at 423.

Return back to FIG. 3. At block 330, the client AP 110 updates the system time 411 with the memory time 421 obtained from the flash memory 420. In this way, instead of the system time 411 being initialized with a much earlier time from build information of a firmware by default, the system time 411 can be set to a reasonable time. Therefore, the validation of the server certificate will not fail unexpectedly.

At block 340, the client AP 110 validates a server certificate received from the authentication server 130 based on the updated system time 411. For example, in a case where the client AP 110 needs to confirm whether the authentication server 130 is trustable, the client AP 110 may obtain the server certificate from the authentication server 130 via the server AP 120.

The server certificate may include the authentication server's certificate chain to the client AP 110. The server certificate is appropriate for the negotiated cipher suite's key exchange algorithm and any negotiated extensions. The server certificate may include a certificate list, which is a sequence (chain) of certificates. The sender's certificate may come first in the list. Each following certificate may directly certify the one preceding it. Because certificate validation requires that root keys be distributed independently, the self-signed certificate that specifies the root certificate authority may be omitted from the chain, under the assumption that the remote end should already possess it in order to validate it in any case. The same message type and structure will be used for the client AP's response to a certificate request message. It should be noted that a client AP may send no certificate if it does not have an appropriate certificate to send in response to the server's authentication request.

At block 350, the client AP 110 synchronizes the system time 411 with a network time in response to the server certificate being validated based on the updated system time 411. When the server certificate is successfully validated by the client AP 110, the client AP 110 may consider the authentication server 130 as a trustable server. In some implementations, the client AP 110 may not send a client certificate to the authentication server 130. In some implementations, the authentication server 130 may request the client AP 110 to send the client certificate after the server certificate is validated, and then validate the client certificate successfully. Thus, the client AP 110 may then access the service provided by the server, and connect to the network. Once the client AP 110 is connected to the network, the system time 411 may be synchronized with a network time via a network time protocol (NTP).

The NTP is an application layer protocol in the TCP/IP protocol suite, which is used to synchronize the clock between the client AP and the server and provide high-precision time correction. An NTP server (e.g. the authentication server 130) receives the precise Coordinated Universal Time (UTC) from a clock source (e.g. an atomic clock, Global Positioning System), and the client AP 110 requests and receives the time from the NTP server. In some implementations, the client AP 110 may obtain the network time using an NTP timer, and update the system time 411 with the obtained network time. In this way, once the client AP 110 is connected to the network, the system time 411 can be synchronized with a current time.

At block 360, the client AP 110 writes the synchronized system time 411 into the flash memory 420. In this way, a validation of the server certificate may be performed based on a reasonable time at the client AP 110. In addition, it is ensured that the memory time 421 in the flash memory 420 is maintained at a reasonable range. Therefore, even if the client AP 110 reboots, the possibility of the server certificate being successfully validated based on the system time 411 obtained from the flash memory 420 is increased.

In some implementations, when validating the server certificate based on the system time 411, the client AP 110 may determine whether the system time 411 is within a validity period of the server certificate. If the system time 411 is within the validity period, the client AP 110 may determine that the server certificate is successfully validated. If the system time 411 is not within the validity period, the client AP 110 may determine that the server certificate is not successfully validated.

The validity period is a time interval during which the certificate authority (CA) warrants that it will maintain information about the status of the certificate. The field is represented as a sequence of two dates: the date on which the certificate validity period begins (Begin Time) and the date on which the certificate validity period ends (End Time). Both Begin Time and End Time may be encoded as UTC-Time or Generalized-Time. The validity period for a certificate is the period of time from Begin Time through End Time, inclusive.

UTC-Time is a universal time type, which is a standard ASN.1 type intended for representation of dates and time. UTC-Time specifies the year through the two low-order digits and time is specified to the precision of one minute or one second. UTC-Time includes either Z (for Zulu, or Greenwich Mean Time) or a time differential. UTC-Time values may be expressed in Greenwich Mean Time (Zulu) and may include seconds (i.e., times are YYMMD-DHHMMSSZ), even where the number of seconds is zero. Conforming systems may interpret the year field (YY) as follows: where YY is greater than or equal to 50, the year may be interpreted as 19YY, and where YY is less than 50, the year may be interpreted as 20YY.

Generalized-Time is a generalized time type, which is a standard ASN.1 type for variable precision representation of time. Optionally, the Generalized-Time field can include a representation of the time differential between local and Greenwich Mean Time. Generalized-Time values may be expressed in Greenwich Mean Time (Zulu) and may include seconds (i.e., times are YYYYMMDDHHMMSSZ), even where the number of seconds is zero. Generalized-Time values may not include fractional seconds.

In this way, the client AP 110 can make sure that the server 130 is trustable to be accessed, and thus the client AP 110 is prevented from connecting to an unsafe service (such as a fake website). Therefore, the security of the communication network can be improved.

Figure 5:
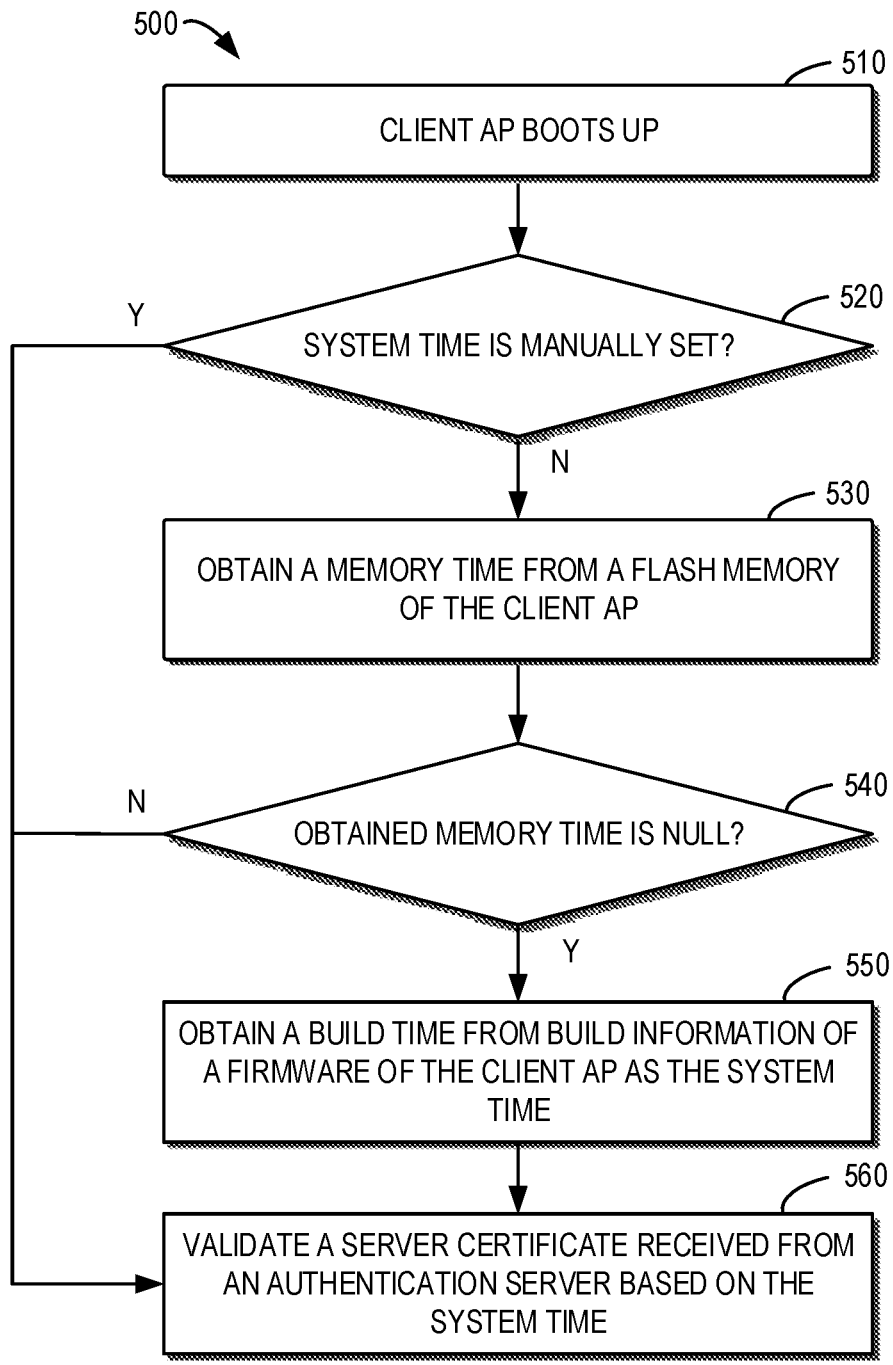
FIG. 5 illustrates a process of setting system time for validating the server certificate in accordance with some alternative implementations of the present disclosure.

In some implementations, the system time 411 may be manually set by a manually set module 410 of the client AP 110, at 423 as shown in FIG. 4. In some implementations, before obtaining the memory time 421 from the flash memory 420, the client AP 110 may determine whether the system time 411 is manually set. If the system time 411 is not manually set, the client AP 110 may obtain the memory time 421 from the flash memory 420, for example, as shown in FIG. 5. If the system time 411 is manually set, the manual set time will be regarded as the system time 411.

FIG. 5 illustrates a process 500 of setting system time for validating the server certificate in accordance with some alternative implementations of the present disclosure. For the purpose of discussion, reference is made to FIGS. 1, 3 and 4 to describe the process 500. It is noted that although only some blocks are shown in the process 500, the process 500 may comprise other operations as described herein.

At block 510, the client AP 110 may boot up. Before obtaining the memory time 421 from the flash memory 420 at block 320, the client AP 110 may determine whether the system time 411 is manually set at block 520. In some cases, the system time 411 may be already manually set to a reasonable time. There is a high possibility that the manually set time is closer to a current time than the memory time 421 in the flash memory 420. Thus, the manually set time may be used prior to the memory time 421.

In some implementations, the client AP 110 may compare the system time 411 with a build time 431 in build information of a firmware 430 of the client AP 110. If the system time 411 is later than the build time 431, the client AP 110 may determine that the system time 411 is manually set. When the client AP boots up, the system time 411 is possibly be initialized with the build time 431 by default or even a time earlier than the build time 431. By comparing the system time 411 with the build time 431, if the system time 411 is later than the build time 431, the system time 411 may be considered as manually set after booting up.

If the AP determines that the system time 411 of the client AP 110 is manually set ("Y" branch), the client AP 110 may validate the server certificate based on the manually set system time at block 560. In such cases, actions in block 320 and blocks 540 and 550 as discussed later may be not performed. If the system time 411 of the client AP 110 is not manually set ("N" branch), the client AP 110 may then obtain the memory time 421 from the flash memory 420 at block 530. In this way, the validation of the server certificate can be performed based on a more reasonable system time, since the manually set time is possibly closer to a current time.

In some implementations, the client AP 110 may determine whether the obtained memory time 421 is null. If the obtained memory time 421 is null, the client AP 110 may obtain the build time 431 from build information of the firmware 430 as the system time 411, for example, as shown in FIG. 5.

After the client AP 110 obtains the memory time 431 from the flash memory 430 at block 530, the process 500 may proceed to block 540. At block 540, the client AP 110 may determine whether the obtained memory time 421 is null. For example, if there is no memory time 421 stored in the flash memory 420, the obtained memory time 421 may be null. If the obtained memory time 421 is not null ("N" branch), the process 500 may proceed to block 560. If the obtained memory time 421 is null ("Y" branch), the client AP 110 may obtain the build time 431 from build information of the firmware 430 as the system time 411, at block 550. Then the process 500 may proceed to block 560. In this way, even if the memory time 421 in the flash memory 420 cannot be used due to some reason, the validation of the server certificate can still be performed based on the build time 431.

In some implementations, if the server certificate is not successfully validated based on the system time 411, the client AP 110 may set the system time 411 using a server time 341 included in the validity period. This will be discussed in detail with reference to FIG. 6.

Figure 6:
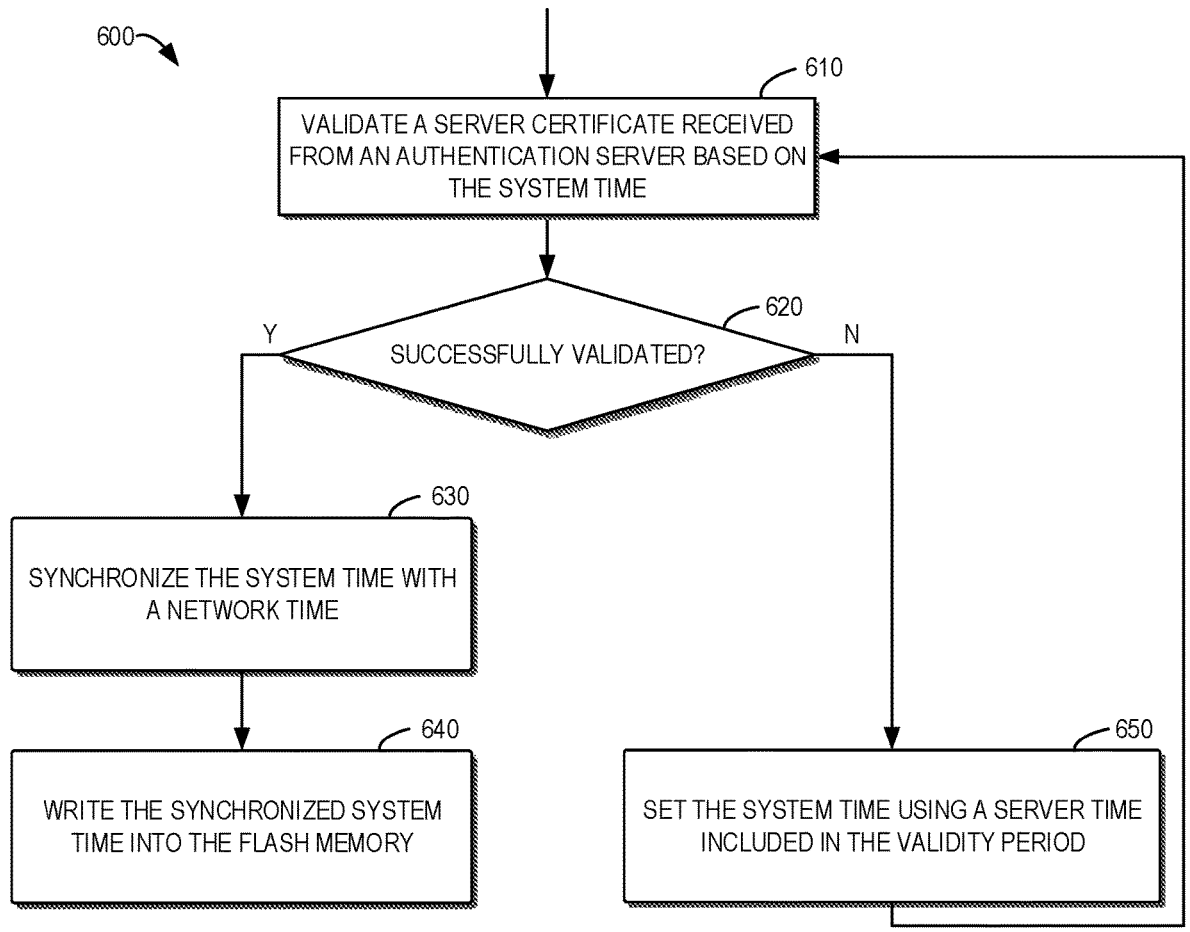
FIG. 6 illustrates another process of setting system time for validating the server certificate in accordance with some alternative implementations of the present disclosure.

FIG. 6 illustrates a process 600 of setting system time for validating the server certificate in accordance with some alternative implementations of the present disclosure. For the purpose of discussion, reference is made to FIGS. 1, 3 and 4 to describe the process 600. It is noted that although only some blocks are shown in the process 600, the process 600 may comprise other operations as described herein.

In some implementations, subsequent to the client AP 110 validating the server certificate based on the system time 411 at block 610, the client AP 110 may determine whether the server certificate is successfully validated at block 620. If the server certificate is successfully validated, the process 600 may proceed to blocks 630 and 640. At block 630, the client AP 110 may synchronize the system time 411 with a network time. At block 640, the client AP 110 may write the synchronized system time 411 into the flash memory 420.

If the server certificate is not successfully validated, the process 600 may proceed to block 650. At block 650, the client AP 110 may set the system time 411 using a server time 441 included in the validity period. The process 600 may then return to block 610, where the client AP 110 may continue to validate the server certificate based on the server time 441.

The term "server time" as described herein may refer to a time when the server certificate is received from the authentication server. In some implementations, the server time may be implemented as an Event-Timestamp in accordance with 802.1X authentication. The Event-Timestamp is included in an Accounting-Request packet to record the time that this event occurred on the Network Access Server, in seconds since Jan. 1, 1970 00:00 UTC, according to the 802.1X standard.

In this way, even if the validation fails unexpectedly based on the system time obtained from the flash memory, the system time can be updated based on the server time. Therefore, when a failure of the validation occurs, the client AP may validate the server certificate based on an updated system time which is a server time.

Figure 7:
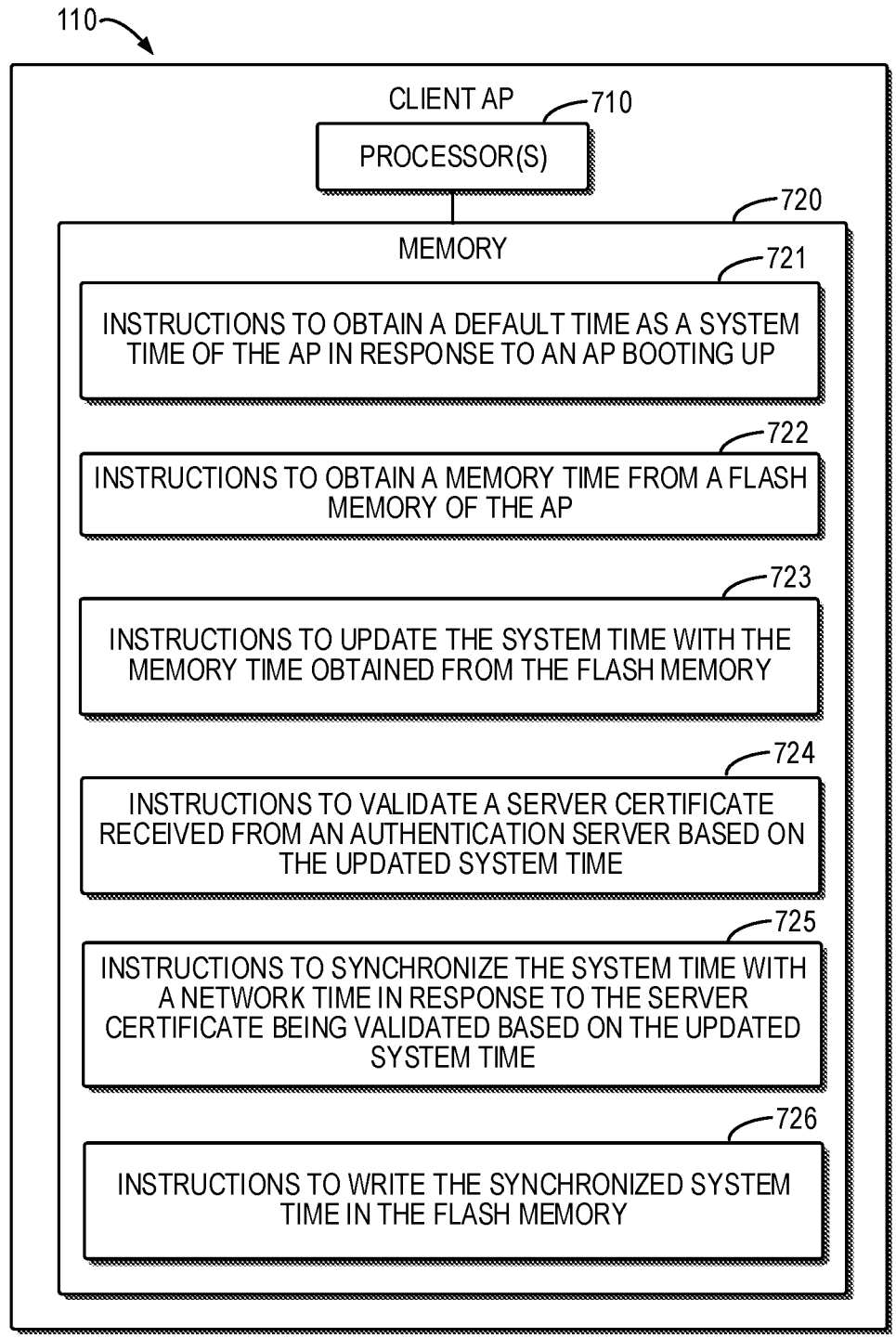
FIG. 7 illustrates a block diagram of an AP in accordance with some example implementations of the present disclosure.

FIG. 7 illustrates a block diagram of a client AP 110 in accordance with some example implementations of the present disclosure. The client AP 110 comprises one or more processors 710 and a memory 720 coupled to the one or more processors 710. The memory 720 stores instructions to cause the one or more processors 710 to implement actions of a method according to some example implementations as described herein.

As illustrated in FIG. 7, the memory 720 stores instructions 721 to obtain a default time as a system time of the client AP in response to the client AP booting up. In some implementations, the memory 720 further stores instructions 722 to obtain a memory time from a flash memory of the client AP. The memory 720 further stores instructions 723 to update the system time with the memory time obtained from the flash memory. In some implementations, the memory 720 further stores instructions 724 to validate a server certificate received from an authentication server based on the updated system time. The memory 720 further stores instructions 725 to synchronize the system time with a network time in response to the server certificate being validated based on the updated system time. In some implementations, the memory 720 further stores instructions 726 to write the synchronized system time into the flash memory. In this way, there is no need to manually set the system time at each time the client boots up or reboots, and the validation of the server certificate can be performed based on a reasonable system time.

In some implementations, the instructions to obtain the memory time from the flash memory comprise instructions to determine whether the system time of the client AP is manually set, and instructions to obtain the memory time from the flash memory in response to determining that the system time of the client AP is not manually set.

In some implementations, the instructions to determine whether the system time of the client AP is manually set comprises instructions to compare the system time with a build time in build information of a firmware of the client AP, and instructions to determine that the system time is manually set in response to the system time being later than the build time.

In some implementations, the instructions to validate the server certificate received from the authentication server based on the updated system time comprises instructions to determine whether the updated system time is within a validity period of the server certificate, instructions to determine that the server certificate is validated in response to determining that the updated system time is within the validity period, and instructions to determine that the server certificate is not validated in response to determining that the updated system time is not within the validity period.

In some implementations, the memory 720 further stores instructions to set the system time using a server time included in the validity period in response to the server certificate being not validated based on the updated system time, and instructions to validate the server certificate base on the set system time.

In some example implementations, the instructions to obtain the memory time from the flash memory comprise instructions to determine whether the obtained memory time is null, and instructions to obtain a build time from build information of a firmware of the client AP as the system time of the client AP in response to determining that the obtained memory time is null.

In some implementations, the instructions to synchronize the system time with the network time comprises instructions to obtain the network time using an NTP timer, and instructions to update the system time with the obtained network time.

In some implementations, the server certificate is received from the authentication server via a server AP over a wireless network. In some implementations, an authentication between the client AP and the authentication server is an IEEE 802.1X authentication.

The present disclosure also provides at least one computer program product tangibly stored on a non-transitory computer-readable storage medium. The computer program product includes program codes or instructions which can be executed to carry out the method as described above with reference to FIG. 3.

While the above discussion used a Wi-Fi communication standard as an illustrative example, in other implementations a wide variety of communication standards and, more generally, wireless communication technologies may be used. Furthermore, while some of the operations in the foregoing implementations were implemented in hardware or software, in general the operations in the preceding implementations can be implemented in a wide variety of configurations and architectures. Therefore, some or all of the operations in the foregoing implementations may be performed in hardware, in software or both.

It should be noted that specific terms disclosed in the present disclosure are proposed for convenience of description and better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a computer-readable medium may be any tangible medium that may contain, or store a program for use by or in connection with an instruction execution system, apparatus, or device. The computer-readable medium may be a computer-readable signal medium or a computer-readable storage medium. A computer-readable medium may include but not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
in response to an access point (AP) booting up, obtaining a default time as a system time of the AP;
obtaining a memory time from a flash memory of the AP;
updating the system time with the memory time obtained from the flash memory;
validating a server certificate received from an authentication server based on the updated system time;
in response to the server certificate being validated based on the updated system time, synchronizing the system time with a network time; and
writing the synchronized system time into the flash memory.

2. The method of claim 1, wherein obtaining the memory time from the flash memory comprises:
determining whether the system time of the AP is manually set; and
in response to determining that the system time of the AP is not manually set, obtaining the memory time from the flash memory.

3. The method of claim 2, wherein determining whether the system time of the AP is manually set comprises:
comparing the system time with a build time in build information of a firmware of the AP; and
in response to the system time being later than the build time, determining that the system time is manually set.

4. The method of claim 1, wherein validating the server certificate comprises:

determining whether the updated system time is within a validity period of the server certificate;

in response to determining that the updated system time is within the validity period, determining that the server certificate is validated; and in response to determining that the updated system time is not within the validity period, determining that the server certificate is not validated.

5. The method of claim 4, further comprising:

in response to the server certificate being not validated based on the updated system time, setting the system time using a server time included in the validity period; and validating the server certificate base on the set system time.

6. The method of claim 1, wherein obtaining the memory time from the flash memory comprises:

determining whether the obtained memory time is null; and in response to determining that the obtained memory time is null, obtaining a build time from build information of a firmware of the AP as the system time of the AP.

7. The method of claim 1, wherein synchronizing the system time with the network time comprises:

obtaining the network time using an network time protocol (NTP) timer; and updating the system time with the obtained network time.

8. The method of claim 1, wherein the server certificate is received from the authentication server via a server AP over a wireless network.

9. The method of claim 8, wherein an authentication between the AP and the authentication server is an IEEE 802.1X authentication.

10. An access point (AP) comprising:

at least one processor; and a memory coupled to the at least one processor, the memory storing instructions to cause the at least one processor to perform acts comprising:

in response to the AP booting up, obtaining a default time as a system time of the AP;

obtaining a memory time from a flash memory of the AP;

updating the system time with the memory time obtained from the flash memory;

validating a server certificate received from an authentication server based on the updated system time;

in response to the server certificate being validated based on the updated system time, synchronizing the system time with a network time; and writing the synchronized system time into the flash memory.

11. The AP of claim 10, wherein obtaining the memory time from the flash memory comprises:

determining whether the system time of the AP is manually set; and in response to determining that the system time of the AP is not manually set, obtaining the memory time from the flash memory.

12. The AP of claim 11, wherein determining whether the system time of the AP is manually set comprises:

comparing the system time with a build time in build information of a firmware of the AP; and in response to the system time being later than the build time, determining that the system time is manually set.

13. The AP of claim 10, wherein validating the server certificate comprises:

determining whether the updated system time is within a validity period of the server certificate;

in response to determining that the updated system time is within the validity period, determining that the server certificate is validated; and in response to determining that the updated system time is not within the validity period, determining that the server certificate is not validated.

14. The AP of claim 13, the acts further comprising:

in response to the server certificate being not validated based on the updated system time, setting the system time using a server time included in the validity period; and validating the server certificate base on the set system time.

15. The AP of claim 10, wherein obtaining the memory time from the flash memory comprises:

determining whether the obtained memory time is null; and in response to determining that the obtained memory time is null, obtaining a build time from build information of a firmware of the AP as the system time of the AP.

16. The AP of claim 10, wherein synchronizing the system time with the network time comprises:

obtaining the network time using an network time protocol (NTP) timer; and updating the system time with the obtained network time.

17. The AP of claim 10, wherein the server certificate is received from the authentication server via a server AP over a wireless network.

18. The AP of claim 17, wherein an authentication between the AP and the authentication server is an IEEE 802.1X authentication.

19. A non-transitory computer-readable medium comprising instructions stored thereon which, when executed by an access point (AP), cause the AP to:

in response to the AP booting up, obtain a default time as a system time of the AP;

obtain a memory time from a flash memory of the AP;

update the system time with the memory time obtained from the flash memory;

validate a server certificate received from an authentication server based on the updated system time;

in response to the server certificate being validated based on the updated system time, synchronize the system time with a network time; and write the synchronized system time into the flash memory.

20. The non-transitory computer-readable medium of claim 19, wherein obtaining the memory time from the flash memory comprises:

determining whether the system time of the AP is manually set; and in response to determining that the system time of the AP is not manually set, obtaining the memory time from the flash memory.

* * * * *